US009674833B2

(12) United States Patent
Shaheen et al.

(10) Patent No.: US 9,674,833 B2
(45) Date of Patent: Jun. 6, 2017

(54) AUTHORIZING IUT REPLICATION AND DISTINGUISHING REQUESTS FOR REPLICATION FROM TRANSFERS

(71) Applicant: InterDigital Patent Holdings, Inc., Wilmington, DE (US)

(72) Inventors: Kamel M. Shaheen, Cairo (EG); Milan Patel, Middlesex (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/068,182

(22) Filed: Mar. 11, 2016

(65) Prior Publication Data

US 2016/0198447 A1 Jul. 7, 2016

Related U.S. Application Data

(63) Continuation of application No. 13/051,372, filed on Mar. 18, 2011, now Pat. No. 9,319,435.

(Continued)

(51) Int. Cl.
*G06F 15/173* (2006.01)
*H04W 72/04* (2009.01)

(Continued)

(52) U.S. Cl.
CPC ....... *H04W 72/044* (2013.01); *H04L 65/1006* (2013.01); *H04L 65/1016* (2013.01);

(Continued)

(58) Field of Classification Search
CPC ......................... H04W 72/004; H04L 65/1006

(Continued)

(56) References Cited

U.S. PATENT DOCUMENTS

| | | | |
|---|---|---|---|
| 7,035,657 | B2 | 4/2006 | Chen |
| 7,127,496 | B2 | 10/2006 | Isozu |

(Continued)

FOREIGN PATENT DOCUMENTS

| | | |
|---|---|---|
| CA | 2605098 | 5/2012 |
| CN | 101015167 | 8/2007 |

(Continued)

OTHER PUBLICATIONS

Ericsson, "Allowing any UE to request the Controller UE to initiate media flow transfer and/or Collaborative Session Control transfer," 3GPP TSG SA WG2 Meeting #72, TD S2-092246 (Apr. 3, 2009).

(Continued)

*Primary Examiner* — Suraj Joshi
*Assistant Examiner* — Joel Mesa
(74) *Attorney, Agent, or Firm* — Invention Mine LLC

(57) ABSTRACT

A method comprising: a Service Centralized and Continuity Application Server (SCC AS) receiving, from a first WTRU, a collaborative session request to replicate a media flow to a second WTRU; the SCC AS authorizing the request; the SCC AS allocating a media resource at a media resource function (MRF) for the media flow; the SCC AS establishing a second-WTRU access leg; the SCC AS updating a first-WTRU access leg for the first WTRU; and the SCC AS updating a remote leg to communicate the replicated media flow to the MRF, wherein, unless the remote party rejects the replication of the media flow, the media flow then flows from the remote party to the MRF, from the MRF to the first WTRU, and from the MRF to the second WTRU.

20 Claims, 14 Drawing Sheets

Related U.S. Application Data

(60) Provisional application No. 61/315,245, filed on Mar. 18, 2010.

(51) Int. Cl.
*H04L 29/06* (2006.01)
*H04W 12/06* (2009.01)

(52) U.S. Cl.
CPC ...... *H04L 65/1063* (2013.01); *H04L 65/1083* (2013.01); *H04L 65/1093* (2013.01); *H04W 12/06* (2013.01)

(58) Field of Classification Search
USPC .......................................................... 709/226
See application file for complete search history.

(56) References Cited

U.S. PATENT DOCUMENTS

| | | | | |
|---|---|---|---|---|
| 7,130,282 | B2 | 10/2006 | Black | |
| 7,480,721 | B2 | 1/2009 | Shaheen | |
| 7,499,719 | B2 | 3/2009 | Rengaraju | |
| 7,667,729 | B2 | 2/2010 | Matsumoto | |
| 7,813,748 | B2 | 10/2010 | Suzuki | |
| 7,856,226 | B2 | 12/2010 | Wong | |
| 7,945,622 | B1 * | 5/2011 | Pegg | G06Q 10/10 709/204 |
| 8,005,027 | B2 | 8/2011 | Ye | |
| 8,077,717 | B2 | 12/2011 | Yan | |
| 8,078,932 | B2 | 12/2011 | Zeira | |
| 8,634,381 | B2 | 1/2014 | Mahdi | |
| 8,670,354 | B2 | 3/2014 | Lohmar | |
| 2003/0088676 | A1 | 5/2003 | Smith | |
| 2003/0145054 | A1 | 7/2003 | Van Dyke | |
| 2004/0205653 | A1 * | 10/2004 | Hadfield | G06Q 10/10 715/255 |
| 2004/0230697 | A1 | 11/2004 | Kiss | |
| 2005/0091380 | A1 | 4/2005 | Gonen | |
| 2005/0141456 | A1 | 6/2005 | Shaheen | |
| 2006/0268781 | A1 | 11/2006 | Svensson | |
| 2007/0285205 | A1 | 12/2007 | Matsumoto | |
| 2008/0119165 | A1 | 5/2008 | Mittal | |
| 2008/0268847 | A1 | 10/2008 | Mukherjee | |
| 2009/0052651 | A1 | 2/2009 | Iwakawa | |
| 2009/0073938 | A1 | 3/2009 | Zhu | |
| 2009/0086742 | A1 | 4/2009 | Ghai | |
| 2009/0103495 | A1 | 4/2009 | Shaheen | |
| 2009/0190573 | A1 | 7/2009 | Siegel | |
| 2009/0191869 | A1 | 7/2009 | Siegel | |
| 2009/0313378 | A1 | 12/2009 | Mahdi | |
| 2009/0319691 | A1 | 12/2009 | Buckley | |
| 2010/0034168 | A1 | 2/2010 | Mahdi | |
| 2010/0036958 | A1 | 2/2010 | Mahdi | |
| 2010/0069101 | A1 | 3/2010 | Mahdi | |
| 2010/0082810 | A1 | 4/2010 | Patel | |
| 2010/0279670 | A1 | 11/2010 | Ghai | |
| 2010/0287406 | A1 | 11/2010 | Ishii | |
| 2010/0312832 | A1 * | 12/2010 | Allen | H04L 65/1016 709/204 |
| 2010/0312841 | A1 | 12/2010 | Doken | |
| 2010/0312897 | A1 | 12/2010 | Allen | |
| 2011/0040836 | A1 | 2/2011 | Allen | |
| 2011/0110275 | A1 | 5/2011 | Shaheen | |
| 2011/0161508 | A1 | 6/2011 | Kim | |
| 2011/0209188 | A1 | 8/2011 | Petersson | |
| 2011/0238845 | A1 | 9/2011 | Keller | |
| 2012/0011257 | A1 | 1/2012 | Kim | |
| 2012/0115483 | A1 | 5/2012 | Noldus | |

FOREIGN PATENT DOCUMENTS

| | | | |
|---|---|---|---|
| CN | 101364874 | A | 2/2009 |
| CN | 101383765 | | 3/2009 |
| EP | 1819092 | | 8/2007 |
| EP | 1848163 | | 10/2007 |
| EP | 1909451 | A1 | 4/2008 |
| EP | 2061212 | | 5/2009 |
| EP | 2073479 | A1 | 6/2009 |
| EP | 2083547 | | 7/2009 |
| EP | 2093968 | A1 | 8/2009 |
| EP | 2239893 | A1 | 10/2010 |
| EP | 2257104 | | 12/2010 |
| EP | 2528407 | A1 | 11/2012 |
| JP | 10242962 | A2 | 9/1998 |
| JP | 2007104163 | | 4/2007 |
| JP | 2008067083 | | 3/2008 |
| JP | 2008078935 | | 4/2008 |
| JP | 2008092579 | | 4/2008 |
| JP | 2008148169 | | 6/2008 |
| JP | 2009164841 | | 7/2009 |
| WO | 2006006897 | | 1/2006 |
| WO | 2006075677 | | 7/2006 |
| WO | 2007142866 | | 12/2007 |
| WO | 2008038200 | A2 | 4/2008 |
| WO | 2008072660 | | 6/2008 |
| WO | 2009013405 | | 1/2009 |
| WO | 2009021549 | | 2/2009 |
| WO | 2009088814 | | 7/2009 |
| WO | 2009122241 | | 10/2009 |
| WO | 2009124943 | A1 | 10/2009 |
| WO | 2009130042 | | 10/2009 |
| WO | 2009134051 | | 11/2009 |
| WO | 2010031351 | | 3/2010 |
| WO | 2010132820 | | 11/2010 |

OTHER PUBLICATIONS

Ericsson, "SCC AS providing Controller UE with information about Collaborative Session changes done by Controllee UE," 3GPP TSG SA WG2 Meeting #72, TD S2-092245 (Apr. 3, 2009).

"3rd Generation Partnership Project; Technical Specification Group Services and System Aspects; IP Multimedia Subsystem (IMS) Service Continuity; Inter-UE Transfer enhancements; Stage 2 (Release 10)", 3GPP Standard; 3GPP TR 23.831, 3rd Generation Partnership Project (3GPP), Mobile Competence Centre ; 650, Route Des Lucioles ; F-06921 Sophia-Antipolis Cedex ; France, No. V0.2.1, Feb. 12, 2010.

Patent Examination Report No. 1, IP Australia, Australian Government, Issued on Jun. 29, 2015 for Australian Patent Application No. 2011227085.

Abstract for Chinese Publication, CN 101015167. Publication date Aug. 8, 2007.

Abstract for Chinese Publication, CN 101364874A. Publication date Feb. 11, 2009.

Abstract for IS2000A7, dated Nov. 2, 1971.

Bertrand, "The IP Multimedia Subsystem in Next Generation Networks," May 30, 2007. http://www.tele.pw.edu.p1/~mareks/auims/IMS_an_overview-1.pdf.

Ericsson, 'SCC AS providing Controller UE with information about Collaborative Session changes done by Controllee UE,' 3GPP TSG SA WG2 Meeting #72, S2-092803 (Mar. 30-Apr. 3, 2009).

Ericsson, "Allowing any UE to request the Controller UE to initiate media flow transfer and/or Collaborative Session Control transfer," 3GPP TSG SA WG2 Meeting #72, TD S2-092246 (Mar. 30-Apr. 3, 2009).

Handley et al., "SIP: Session Initiation Protocol," Internet Engineering Task Force, Request For Comment 2543, Mar. 1999.

Handley et al. (RFC 4566 'SDP: Session Description Protocol', Network Working Group, University of Glasgow, Jul. 2006).

Hutton et al., "An Architecture for Media Recording Using the Session Initiation Protocol," Internet Engineering Task Force, Feb. 2010.

Imai et al., "Duplicate a SIP Session," Internet Engineering Task Force, Dec. 2007.

Johnston et al., "Session Initiation Protocol Services Examples," SIPPING Working Group, Inter-Draft, draft-ietf-sipping-services-examples-13 (Jul. 16, 2007).

(56) References Cited

OTHER PUBLICATIONS

Levin et al., "Conveying Feature Tags with the Session Initiation Protocol (SIP) REFER Method," Internet Engineering Task Force, Request for Comment 4508, May 2006.
Nokia et al., "Clarify determining the capabilities of an UE to act as Controller/Controllee UE," 3GPP TSG SA WG2 Meeting #72, S2-091958 (Mar. 30-Apr. 3, 2009).
Notification of International Search Report and the Written Opinion and ISR and WO for PCT/US2011/020856, dated Apr. 20, 2011, 12 pages.
Notification of Transmittal of the International Preliminary Report on Patentability for PCT/US2010/056734 dated Feb. 29, 2012, 18 pages.
Notification of Transmittal of the International Preliminary Report on Patentability for PCT/US2010/061881 dated Mar. 29, 2012, 19 pages.
Panasonic et al., 'DHCP Discovery of ANDSF for UE While Roaming,' C1-101234,3GPP TSG-CT WG1 Meeting #63, San Francisco, California, USA, Feb. 22-26, 2010.
Patent Examination Report No. 2, IP Australia, Australian Government, Issued on Nov. 23, 2015 for Australian Patent Application No. 2011227085.
Qualcomm Europe, 'Discussion on How to Initiate Inter-UE Transfer Operation,' C1-092464,3GPP TSG CT WG1 Meeting #59, Los Angeles, California, USA, Jun. 22-26, 2009.
Rehor et al., "Requirements for SIP-Based Media Recording (SIPREC)," Internet Engineering Task Force, Mar. 2010.
Research in Motion, "Addition of Media Feature Tag for Indicating IUT Controller Capability," C1-1012513GPP, TSG-CT WG1 Meeting #63, San Francisco, California, USA, Feb. 22-26, 2010.
Rosenberg et al., "Caller Preferences for the Session Initiation Protocol (SIP)," Internet Engineering Task Force, Request For Comment 3841, Aug. 2004.
Rosenberg et al., "SIP: Session Initiation Protocol," Internet Engineering Task Force, Request For Comment 3261, Jun. 2002.
Starent Networks, "Controller Initiated Release collaborative session," 3GPP TSG SA WG2 Meeting #72, S2-091849 (Mar. 30-Apr. 3, 2009).
Third Generation Partnership Project, 'Technical Specification Group Core Network and Terminals; IP Multimedia (IM) Core Network (CN) Subsystem Inter-UE Transfer Enhancements; Stage 3 (Release 10),' 3GPP TR 24.837 v1.1.0, Feb. 2011.
Third Generation Partnership Project, 'Technical Specification Group Core Network and Terminals; IP Multimedia Call Control Protocol Based on Session Initiation Protocol (SIP) and Session Description Protocol (SDP); Stage 3 (Release 10),' 3GPP TS 24.229 vIO.2.0, Dec. 2010.
Third Generation Partnership Project, 'Technical Specification Group Services and Architecture; IP Multimedia Subsystem (IMS) Service Continuity; Stage 2 (Release 10),' 3GPP TS 23.237 V10.0.0 (Dec. 2009).
Third Generation Partnership Project, 'Technical Specification Group Services and Architecture; IP Multimedia Subsystem (IMS) Service Continuity; Stage 2 (Release 10),' 3GPP TS 23.237 v10.3.0, Sep. 2010.
Third Generation Partnership Project, 'Technical Specification Group Services and Architecture; IP Multimedia Subsystem (IMS) Service Continuity; Stage 2 (Release 8),' 3GPP TS 23.237 v8.3.0, (Mar. 2009).
Third Generation Partnership Project, 'Technical Specification Group Services and Architecture; IP Multimedia Subsystem (IMS) Service Continuity; Stage 2 (Release 8),' 3GPP TS 23.237 v8.6.0, Dec. 2009.
Third Generation Partnership Project, 'Technical Specification Group Services and Architecture; IP Multimedia Subsystem (IMS) Service Continuity; Stage 2 (Release 9),' 3GPP TS 23.237 v9.3.0, Dec. 2009.
Third Generation Partnership Project, 'Technical Specification Group Services and Architecture; P Multimedia Subsystem (IMS) Service Continuity; Stage 2 (Release 8),' 3GPP TS 23.237 v8.5.0, Sep. 2009.
Third Generation Partnership Project, 'Technical Specification Group Services and Architecture; P Multimedia Subsystem (IMS) Service Continuity; Stage 2 (Release 9),' 3GPP TS 23.237 v9.2.0, Sep. 2009.
Third Generation Partnership Project, 'Technical Specification Group Services and Aspects; IP Multimedia Subsystem (IMS) Service Continuity; Stage 2 (Release 10),' 3GPP TS 23.237 v10.4.1, Jan. 2011.
Third Generation Partnership Project, 'Technical Specification Group Services and System Aspects; IP Multimedia Subsystem (IMS) Centralized Services; Stage 2 (Release 8),' 3GPP TS 23.292 v8.6.0, Dec. 2009.
Third Generation Partnership Project, 'Technical Specification Group Services and System Aspects; IP Multimedia Subsystem (IMS) Centralized Services; Stage 2 (Release 8),' 3GPP TS 23.292 v8.8.0, Jun. 2010.
Third Generation Partnership Project, 'Technical Specification Group Services and System Aspects; IP Multimedia Subsystem (IMS) Centralized Services; Stage 2 (Release 9),' 3GPP TS 23.292 v9.7.0, Sep. 2010.
Third Generation Partnership Project, 'Technical Specification Group Services and System Aspects; IP Multimedia Subsystem (IMS) Service Continuity; Inter-UE Transfer Enhancements; Stage 2 (Release 10),' 3GPP TR 23.831 v10.0.0, Sep. 2010.
Third Generation Partnership Project, 'Technical Specification Group Services and System Aspects; IP Multimedia Subsystem (IMS) Service Continuity; Stage 2 (Release 8),' 3GPP TS 23.237 V8.7.0 (Mar. 2010).
Third Generation Partnership Project, 'Technical Specification Group Services and System Aspects; IP Multimedia Subsystem (IMS) Service Continuity; Stage 2 (Release 9),' 3GPP TS 23.237 V9.7.0 (Dec. 2010).
Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 1.2.0 (Mar. 2011).
Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 vO.3.0, Mar. 2010.
Third Generation Partnership Project, "Technical Specification Group Services and System Aspects; IP Multimedia Subsystem (IMS) service continuity enhancements; Service, policy and interaction; Stage 2 (Release 9)," 3GPP TR 23.838 V9.0.0 (Jun. 2009).
Third Generation Partnership Project, Technical Specification Group Services and Architecture; IP Multimedia Subsystem (IMS) Service Continuity; Stage 2 (Release 9), 3GPP TS 23.237 v9.6.0, Sep. 2010.
Third Generation Partnership Project, Technical Specification Group Services and System Aspects; IP Multimedia Subsystem (IMS) Centralized Services; Stage 2 (Release 10), 3GPP TS 23.292 v10.2.0, Sep. 2010.
Third Generation Partnership Project, Technical Specification Group Services and System Aspects; IP Multimedia Subsystem (IMS) Centralized Services; Stage 2 (Release 9), 3GPP TS 23.292 v9.4.0, Dec. 2009.
Third Generation Partnership Project, Technical Specification Group Services and System Aspects; IP Multimedia Subsystem (IMS) Service Continuity; Inter-UE Transfer Enhancements; Stage 2 (Release 10),3GPPTR 23.831 v0.2.1, Feb. 2010.
Third Generation Partnership Project, "Technical Specification Group Services and System Aspects; IP Multimedia Subsystem (IMS) Service Continuity; Inter-UE Transfer Enhancements; Stage 2 (Release 10)," 3GPP TR 23.831 v0.1.0, Nov. 2009.
Third Generation Partnership Project, "Technical Specification Group Services and System Aspects; IP Multimedia Subsystem (IMS) Service Continuity; Stage 2 (Release 10)," 3GPP TS 23.237 V10.4.0 (Dec. 2010).

(56) References Cited

OTHER PUBLICATIONS

Written Opinion of the International Preliminary Examining Authority for PCT/US2010/061881 dated Nov. 25, 2011, 11 pages.
"3rd Generation Partnership Project; Technical Specification Group Services and Architecture; IP Multimedia Substem (IMS) Service Continuity Enhancements; Service Policy and interaction; Stage 2 (Release 9)", 3GPP Standard; 3GPP TS 23.838, 3rd Generation Partnership Project (3GPP), Mobile Competence Centre; 650, Route Des Lucioles; F-06921 Sophia-Antipolis Cedex; France, No. V1.1.0, Apr. 1, 2009.
English Translation of foreign patent publication CN 101364874 A, published on Feb. 11, 2009.

* cited by examiner

AUTHORIZING IUT REPLICATION AND DISTINGUISHING REQUESTS FOR REPLICATION FROM TRANSFERS

CROSS REFERENCE TO RELATED APPLICATIONS

This application is a continuation of U.S. Non-Provisional patent application Ser. No. 13/051,372 filed on Mar. 18, 2011, which claims the benefit of U.S. Provisional Patent Application No. 61/315,245 filed on Mar. 18, 2010, the contents of both are hereby incorporated by reference herein.

BACKGROUND

The Internet Protocol (IP) Multimedia Subsystem (IMS) is an architectural framework for delivering IP-based multimedia services. A wireless transmit/receive unit (WTRU) may connect to an IMS through various access networks, including but not limited to networks based on technology such as UMTS Terrestrial Radio Access Network (UTRAN), Long Term Evolution (LTE), Worldwide Interoperability for Microwave Access (WiMax), or Wireless Local Area Network (WLAN) technology. A WTRU may access the IMS through a packet-switched (PS) domain. Through the use of IMS Centralized Services (ICS), a WTRU may additionally access IMS services via a circuit-switched (CS) domain.

Inter-UE transfer (IUT) allows a communication session transfer from one WTRU to another. A transfer may occur when a user shares media with another user, when a user takes a session or session component and moves away from the device that is currently involved in the session, when a user wants to transfer media to devices more capable of handling media (i.e. a larger screen, clearer audio, etc.), when the device currently involved in the session has low battery or poor radio coverage, or when the remote end changes media characteristics or adds further media and the operation may not be performed well by a current source WTRU.

An inter-operator transfer may include a collaborative session between WRTUs. Usually at least one controller WTRU is involved in a collaborative session. Session invitations may be routed to a controller WTRU and a communication session may be directed to a device with controller capabilities. Devices may register their capabilities and may be prioritized over other devices for the purpose of receiving a communication session.

Instead of transferring a session, replicating some or all media components in a session may be desirable. For example, if a user wants to share an ongoing session with another user. However, it is difficult to distinguish between a request for the transfer of media components and a request for replication of media components. Also, it is difficult to determine if a device is able to perform replication and how often replication of a session may occur.

SUMMARY

A method including: a Service Centralized and Continuity Application Server (SCC AS) establishing a collaborative session control with a first wireless transmit/receive unit (WTRU), wherein the first WTRU is associated with a first subscription, wherein the first WTRU is receiving a media flow from a remote party; the SCC AS receiving, from the first WTRU, a collaborative session request to replicate the media flow to a second WTRU; the SCC AS authorizing the received collaborative session request; the SCC AS allocating a media resource at a media resource function (MRF) for the media flow; the SCC AS establishing a second-WTRU access leg for the second WTRU to receive the requested replicated media flow from the MRF; the SCC AS updating a first-WTRU access leg for the first WTRU to then receive the media flow from the MRF; and the SCC AS updating a remote leg to communicate the replicated media flow to the MRF, wherein, unless the remote party rejects the replication of the media flow, the media flow then flows from the remote party to the MRF, from the MRF to the first WTRU, and from the MRF to the second WTRU.

In one embodiment, the second WTRU is also associated with the first subscription.

In one embodiment, the second WTRU is not associated with the first subscription. In one such embodiment, the method further includes carrying out further authorization procedures at the SCC AS; in another such embodiment, the second WTRU is associated with a second subscription, the method further includes carrying out further authorization procedures at the second WTRU.

In one embodiment, the SCC AS receives the collaborative session request from the first WTRU via a Serving-Call State Control Function (S-CSCF).

In one embodiment, establishing the second-WTRU access leg includes the SCC AS transmitting a request to establish the second-WTRU access leg.

In one embodiment, authorizing the received collaborative session request includes checking that the first subscription allows the requested replication of the media flow to the second WTRU.

In one embodiment, the SCC AS updates the remote leg to communicate the replicated media flow to the MRF unless a Proxy-Call State Control Function rejects the session replication based on decisions made by a policy and charging control function.

In one embodiment, the first WTRU is a controller WTRU with respect to the media flow, and wherein the second WTRU is a controllee WTRU with respect to the media flow.

Another embodiment takes the form of a Service Centralized and Continuity Application Server (SCC AS) that includes: a processor; and data storage containing instructions executable by the processor for causing the SCC AS to carry out a set of functions, the set of functions comprising: establishing a collaborative session control with a first wireless transmit/receive unit (WTRU), wherein the first WTRU is associated with a first subscription, wherein the first WTRU is receiving a media flow from a remote party; receiving, from the first WTRU, a collaborative session request to replicate the media flow to the second WTRU; authorizing the received collaborative session request; allocating a media resource at a media resource function (MRF) for the media flow; establishing a second-WTRU access leg for a second WTRU to receive the requested replicated media flow from the MRF; updating a first-WTRU access leg for the first WTRU to then receive the media flow from the MRF; and updating a remote leg to communicate the replicated media flow to the MRF, wherein, unless the remote party rejects the replication of the media flow, the media flow then flows from the remote party to the MRF, from the MRF to the first WTRU, and from the MRF to the second WTRU.

In one embodiment, the second WTRU is also associated with the first subscription.

In one embodiment, the second WTRU is not associated with the first subscription. In one such embodiment, comprising carrying out further authorization procedures at the SCC AS; in another such embodiment, the second WTRU is associated with a second subscription, the SCC AS further carries out instructions to further authorize the second WTRU.

In one embodiment, the SCC AS receives the collaborative session request from the first WTRU via a Serving-Call State Control Function (S-CSCF).

In one embodiment, establishing the second-WTRU access leg comprises the SCC AS transmitting a request to establish the second-WTRU access leg.

In one embodiment, authorizing the received collaborative session request includes checking that the first subscription allows the requested replication of the media flow to the second WTRU.

In one embodiment, the SCC AS updates the remote leg to communicate the replicated media flow to the MRF unless a Proxy-Call State Control Function rejects the session replication based on decisions made by a policy and charging control function.

In one embodiment, the first WTRU is a controller WTRU with respect to the media flow, and wherein the second WTRU is a controllee WTRU with respect to the media flow.

BRIEF DESCRIPTION OF THE DRAWINGS

A more detailed understanding may be had from the following description, given by way of example in conjunction with the accompanying drawings wherein.

DETAILED DESCRIPTION

Figure 1A:
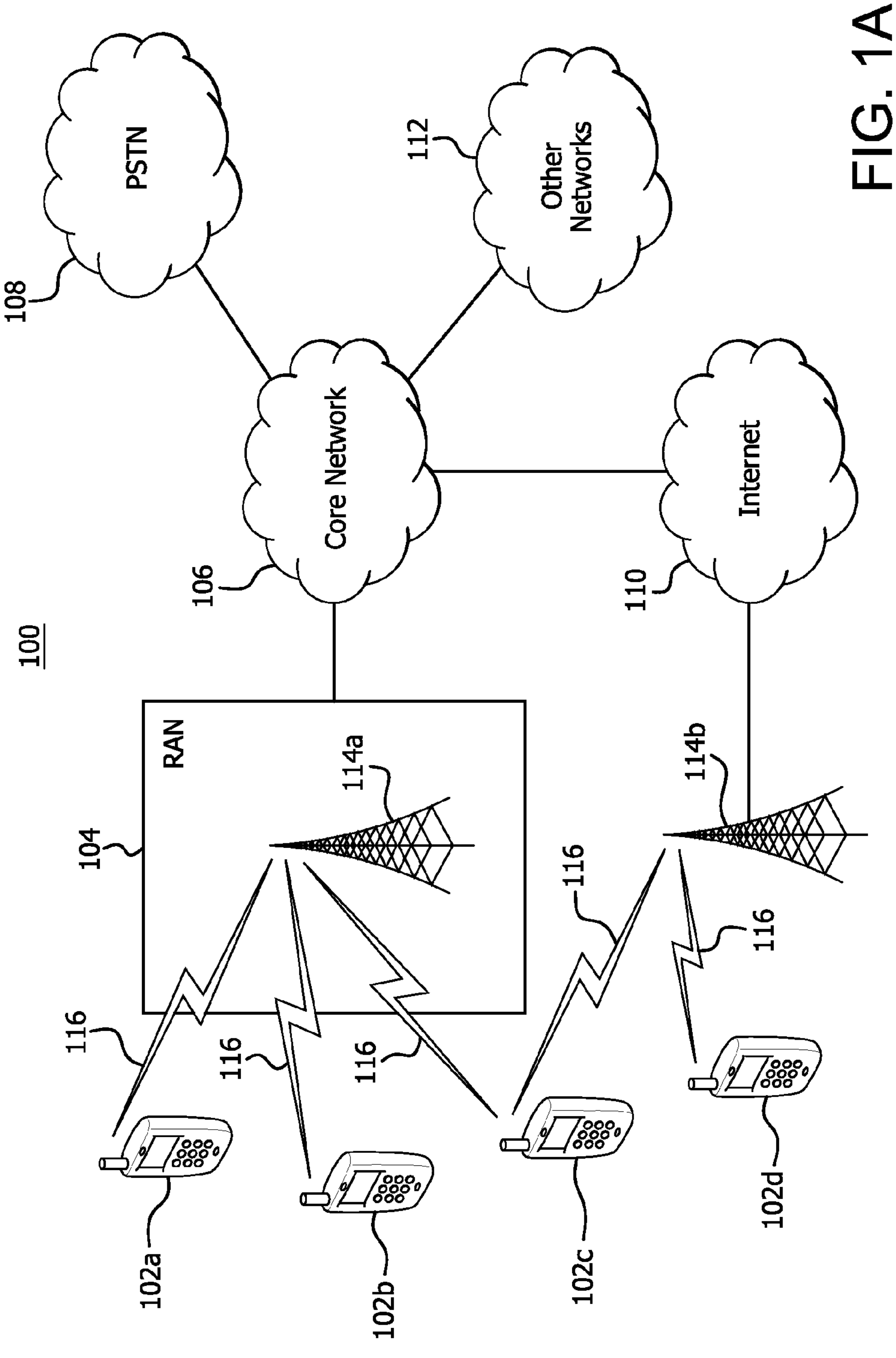
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
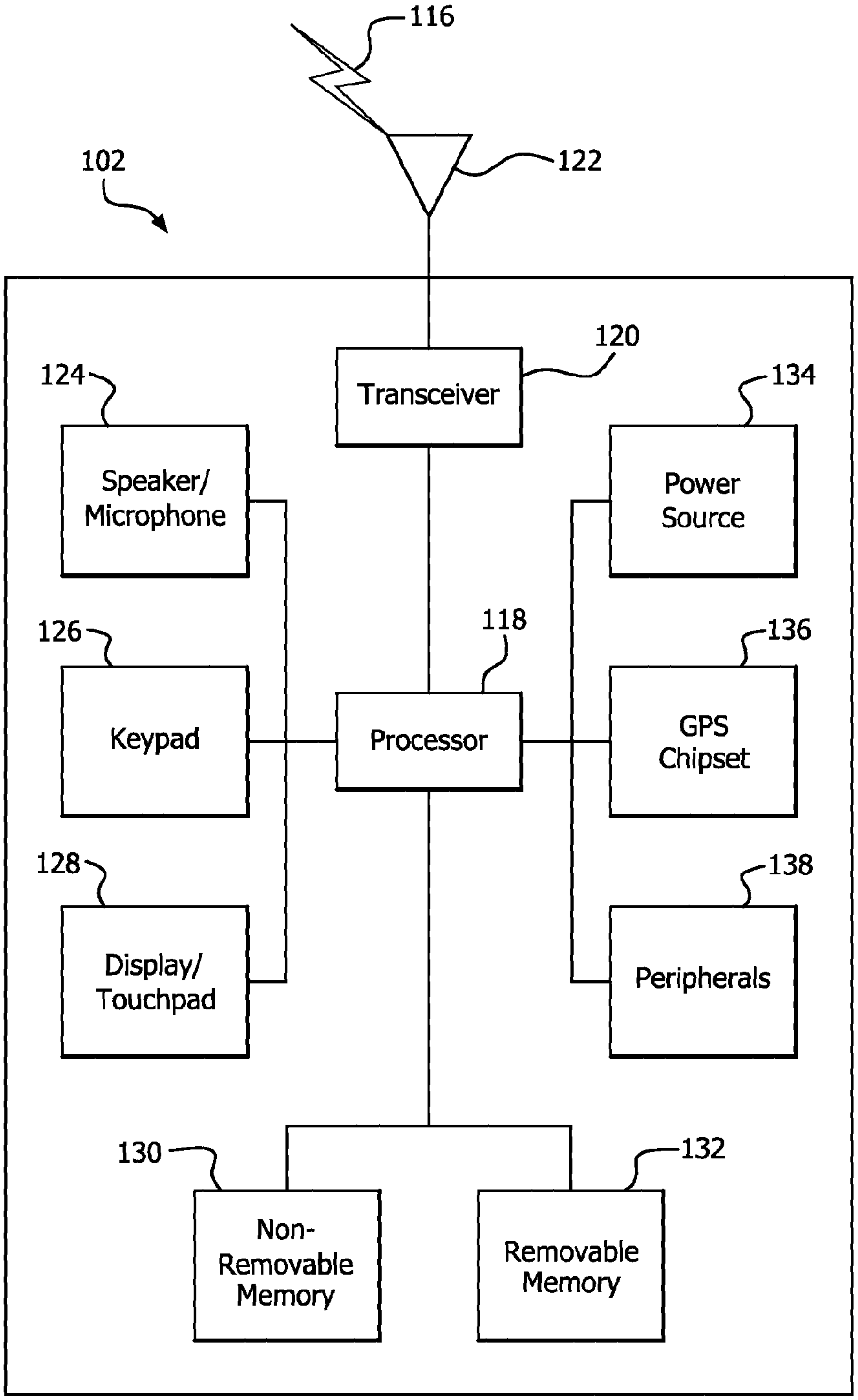
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
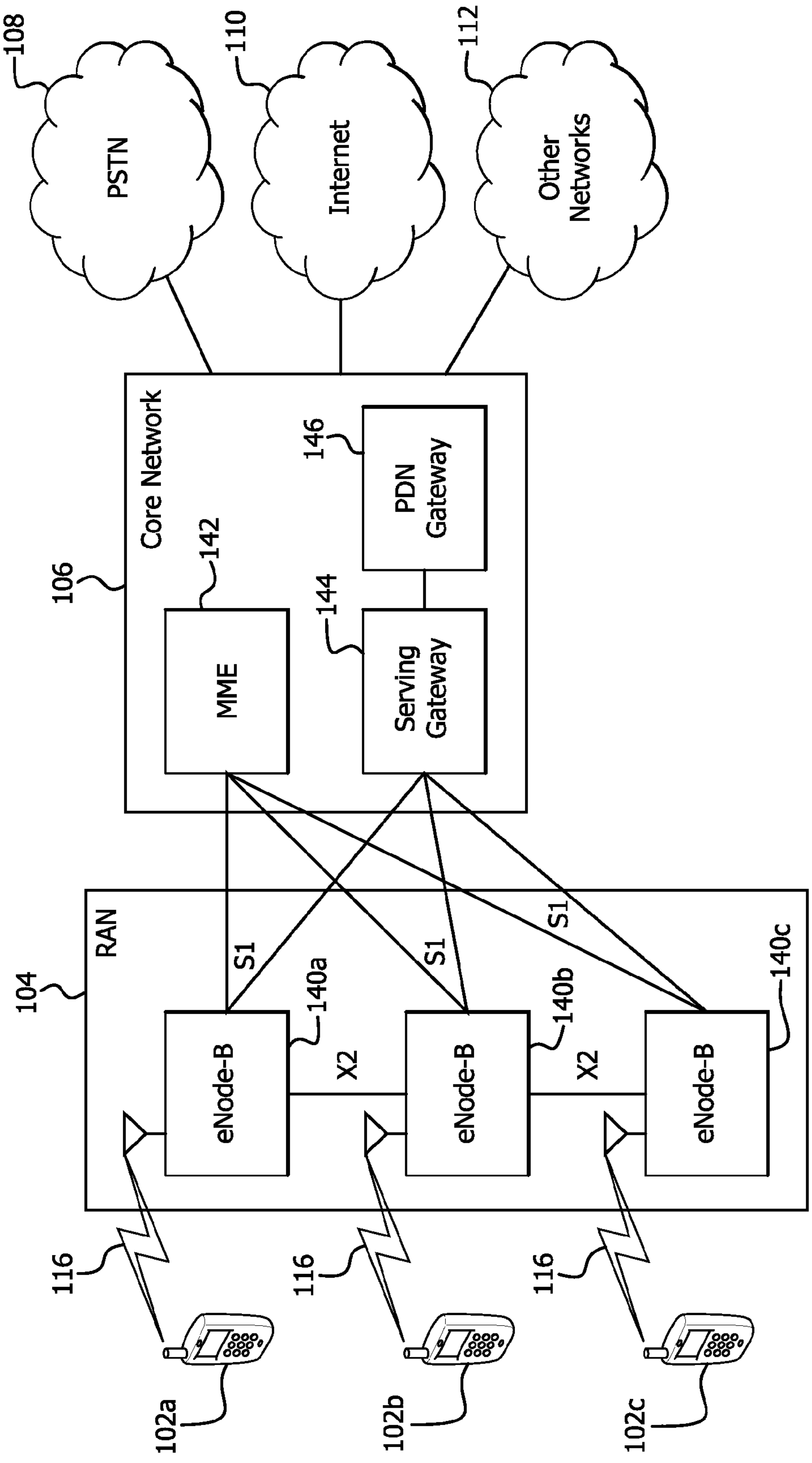
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142*a*, 142*b*, 142*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

A collaborative session, a session split across a plurality of WTRUs and anchored in the Service Centralized and Continuity Application Server (SCC AS) may be established in accordance with inter-WTRU transfer procedures. In establishing the collaborative session, the WTRU initiating the Inter-user Transfer (IUT) becomes the controller WTRU. Other WTRUs involved in the collaborative session become the controlee WTRUs. Subsequent IUTs, initiated by controller WTRU, may also be performed in the collaborative session. The SCC AS may provide coordination of the collaborative session procedures, which may involve both the controller WTRU and the controlee WTRU. A complete multi-media session may be transferred and/or replicated from one WTRU to another WTRU via inter device transfer and/or replication of the collaborative session.

Inter-device transfer and/replication procedures may be initiated by the WTRU based on information received from a target WTRU or via user input.

Figure 2:
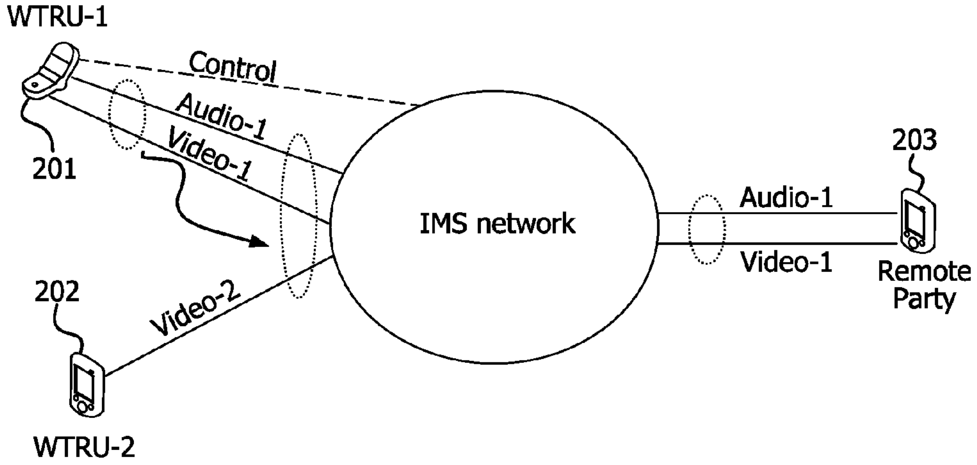
FIG. 2 shows an example of a replication scenario.

FIG. 2 shows a system level example of a replication scenario. A WTRU-1 201 may have a multimedia session with audio-1 and video-1 media flows between WTRU-1 201 and a remote party 203. The WTRU-1 201 may transmit a request to replicate the video-1 media flow as video-2 media flow to WTRU-2 202. One collaborative session may be established for replication. After the success of replication, WTRU-1201 may retain control of the collaborative session control, audio-1 and video-1 media flows may remain with WTRU-1 201, and Internet Protocol (IP) Multimedia Subsystem (IMS) network may replicate video-1 and video-2 in WTRU-2 202. Video-1 and video-2 media flows may transfer the same video packets from remote party 203. WTRU-1 201 and WTRU-2 202 may belong to the same IMS subscription or different IMS subscriptions. Either WTRU-1201 or WTRU-2 202 may request to replicate video-1 from WTRU-1 201 to itself.

Figure 3:
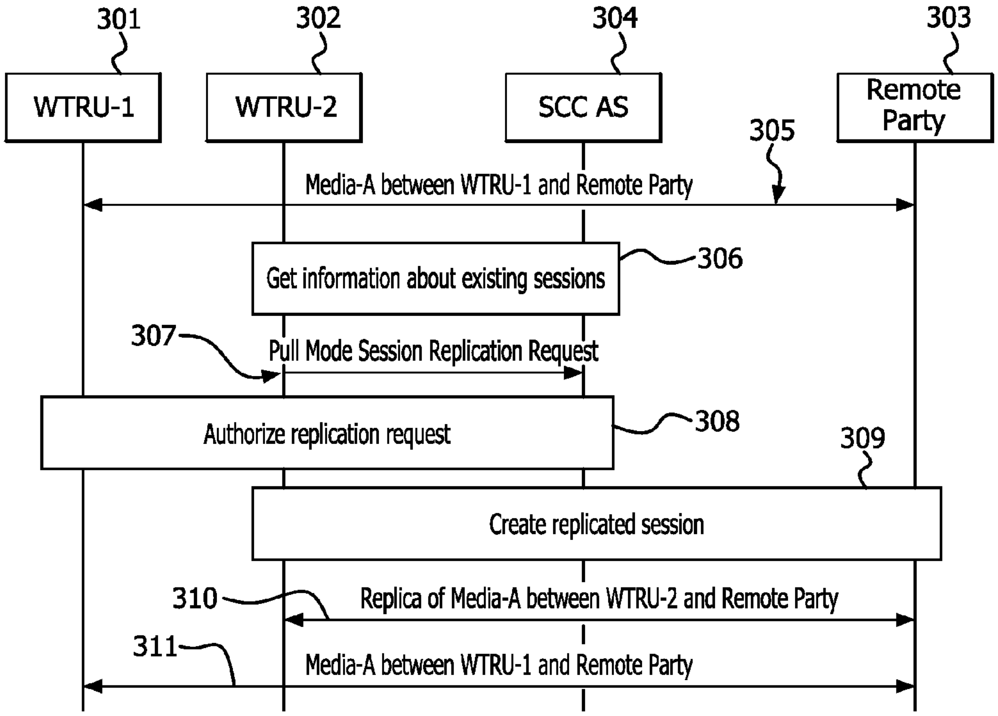
FIG. 3 shows an example of a pull mode session replication.

FIG. 3 shows a signaling diagram of an example of a pull mode session replication. In a pull session replication, a second WTRU may request replication of a session ongoing between first WTRU and a remote party. After the replication procedure is complete, the session may be independent. Media A may be established between WTRU-1 301 and a remote party 303 (305). WTRU-2 302 may obtain information about the existing session and their media flows (306). WTRU-2 302 may use the session information obtained to transmit a session replication request towards the SCC AS 304 (307). The request may include information indicating that it is a session replication request.

The SCC AS 304 may request WTRU-1 301 to authorize the replication request or the SCC AS 304 may authorize the request on behalf of WTRU-1 301 (308). If the media request is authorized, WTRU-2 302 may create a new session with the remote party 303 (309). When the new session is established, the state of the original media may be replicated. For example the same playback state and same used media may be replicated. If remote party 303 may not support setting up a replicated session, the flow may fail. A new session, where the media is a replica of Media-A may be established between WTRU-2 302 and the remote party 303 (310). Media A may be established between WTRU-1 301 and the remote party 303 (311).

Figure 4:
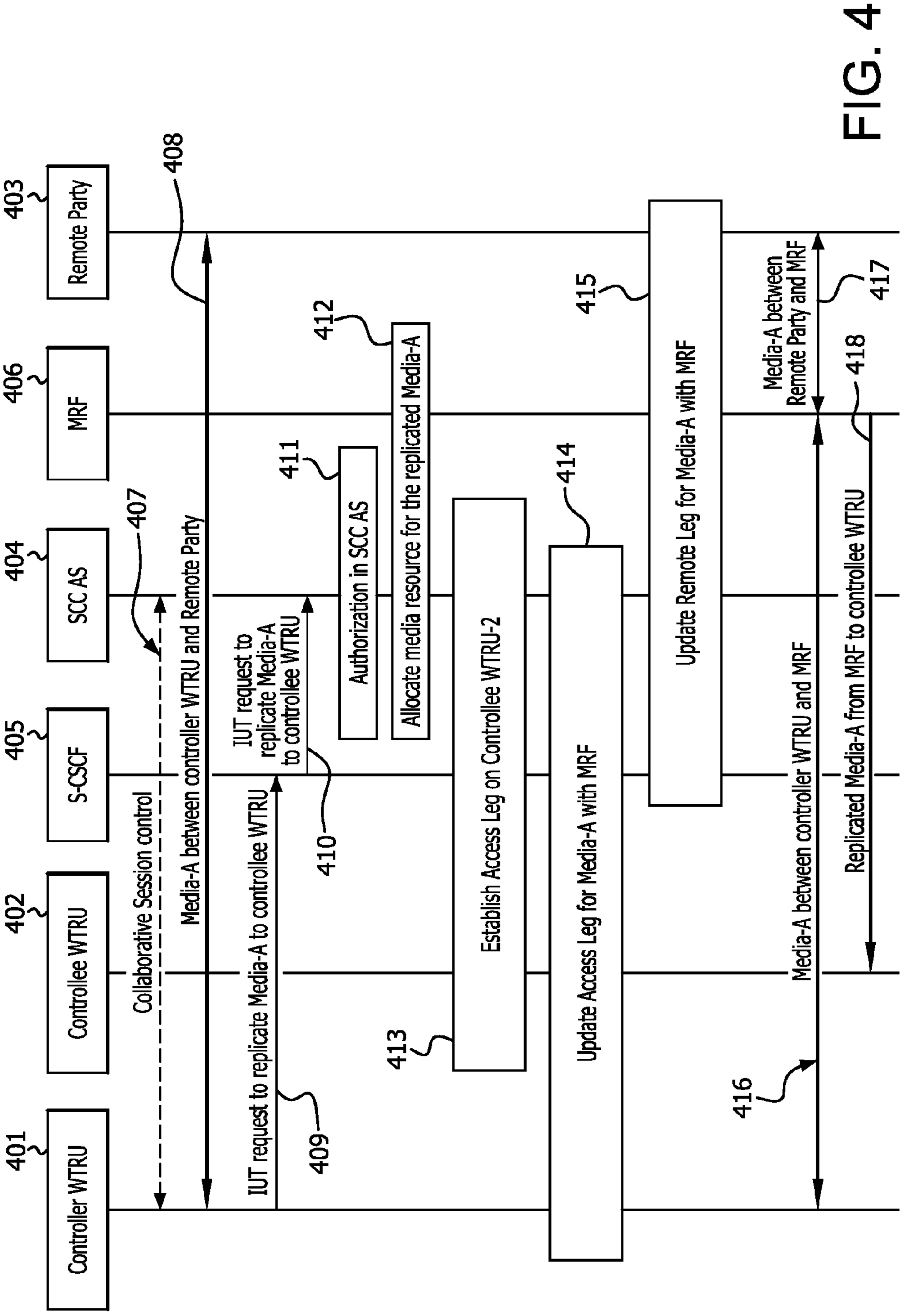
FIG. 4 shows an example of a push mode session replication by a network.

FIG. 4 shows a signaling diagram of an example of a push mode media flow replication by a network. A collaborative session control may be established between controller WTRU 401 and SCC AS 404 (407). A media flow, Media-A, may be established between controller WTRU 401 and remote party 403 (408). Controller WTRU 401 may transmit a collaborative session IUT request to replicate Media-A in controlee WTRU 402 to Serving-Call State Control Function (S-CSCF) 405 (409). The session setup request may include enough information for the network to indentify that the replicated media flow is Media-A, identify that the source of the replicated media flow is controller WTRU 401, identify that the target of the replicated media flow is controlee WTRU 402, and keep the collaborative session control of Media-A in controller WTRU 401. The S-CSCF 405 may then forward the collaborated session IUT request to the SCC AS 404. The SCC AS 404 may verify that controller WTRU 401 is an IUT subscriber and that the profile of controller WTRU 401 allows controller WTRU 401 to replicate media to controlee WTRU 402 (410). The SCC AS 404 may then verify that controller WTRU 401 is an IUT subscriber, and that the profile of controller WTRU 401 allows controller WTRU 401 to replicate media flow to controlee WTRU 402 (411).

The SCC AS 404 may allocate media resource in media resource function (MRF) 406 for the replicated Media-A (412). The SCC AS 404 may then transmit a request to establish an access leg at controlee WTRU 402 for Media-A (413). The SCC AS 404 may then update the access leg on controller WTRU 401 for the replicated media flow, Media-A, with MRF 406 (414). The SCC AS 404 may then update the remote leg to communicate Media-A with MRF 406 (415). Media-A may be established between controller WTRU 401 and MRF 406 (416), between controlee WTRU 402 and MRF 406 (418), and between remote party 403 and MRF 406 (417).

If controller WTRU 401 and controlee WTRU 402 are part of different subscriptions, further authorization procedures may be required at the SCC AS 404 and controlee WTRU 402, assuming that controller WTRU 402 is also an IUT WTRU/subscriber.

Figure 5:
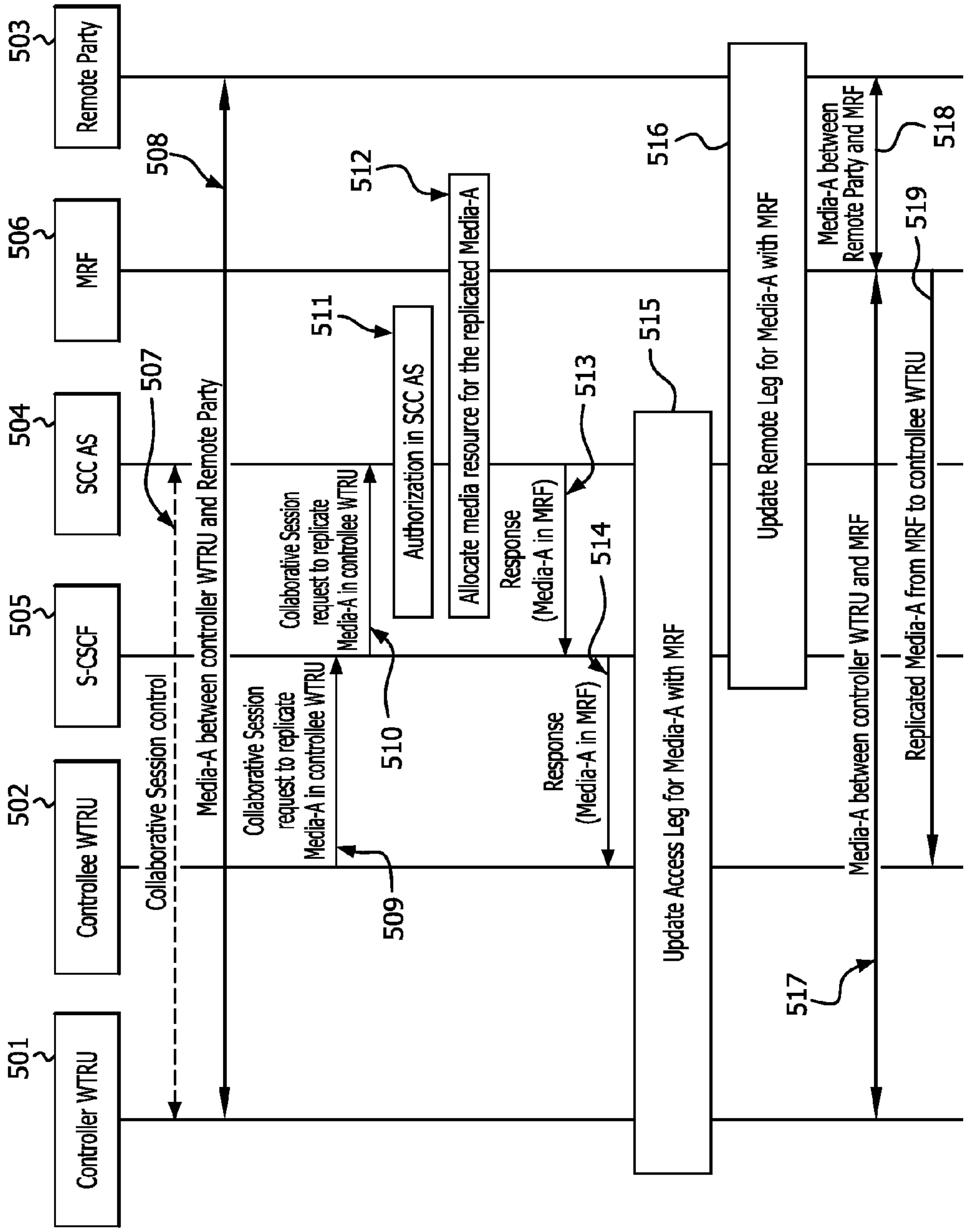
FIG. 5 shows an example of a pull mode session replication by a network.

FIG. 5 shows a signaling diagram of an example of a pull mode media flow replication by a network. A collaborative session control may be established between controller WTRU 501 and SCC AS 504 (507). A media flow, Media-A, may be established between controller WTRU 501 and remote party 503 (508). Controlee WTRU 502 may transmit a collaborative session IUT request to replicate Media-A in controlee WTRU 502 to S-CSCF 505 (509). The session setup request may include information for the network to identify that the replicated media flow is Media-A, identify that the source of the replicated media flow is controller WTRU 501, identify that the target of the replicated media flow is controlee WTRU 502, and maintain the collaborative session control of Media-A in controller WTRU 501. The S-SCSF 505 may forward the collaborative session request to the SCC AS 504 (510). The SCC AS 504 may then verify that controlee WTRU 502 is an IUT subscriber, and that the profile of controller WTRU 501 allows controlee WTRU 502 to replicate media flow from controller WTRU 501 (511).

The SCC AS 504 may then allocate media resource for the replicated Media-A (512). The SCC AS 504 may then transmit a response to the S-CSCF 505 (513). The S-CSCF 505 may forward the response to the controlee WTRU 502 (514). The SCC AS 504 may update the access leg on the controller WTRU 501 for the replicated media flow, Media-A, with MRF 506 (515). The SCC AS 504 may then update the remote leg to communicate Media-A with MRF 506 (516). Media-A may be established between controller WTRU 501 and MRF 506 (517), between controlee WTRU 502 and MRF 506 (519), and between remote party 503 and MRF 506 (518).

A remote party may have the authority to reject or authorize session replications. The remote party may be configured to not share a session with another party. For example, the remote party may not share the session because the session may include sensitive information or the remote party may not identify the user of the WTRU requesting replication.

A Proxy-Call State Control Function (P-CSCF) that the remote party is attached to may reject further session replications based on decisions made by the policy and charging control (PCC) functions. For example a PCC function may identify that the number of simultaneous sessions that the remote party may be engaged in is exceeded, the maximum bandwidth allocated to the remote party subscription is exceeded, or a policy restricting replication of session or placing a limit on a maximum number of sessions.

If WTRU-2 has IUT replication capabilities, then the SCC AS may be in the path. The SCC AS may reject a request for replication either from WTRU-2 or toward WTRU-2 based on the subscription, operator policy, or user preference.

Figure 6:
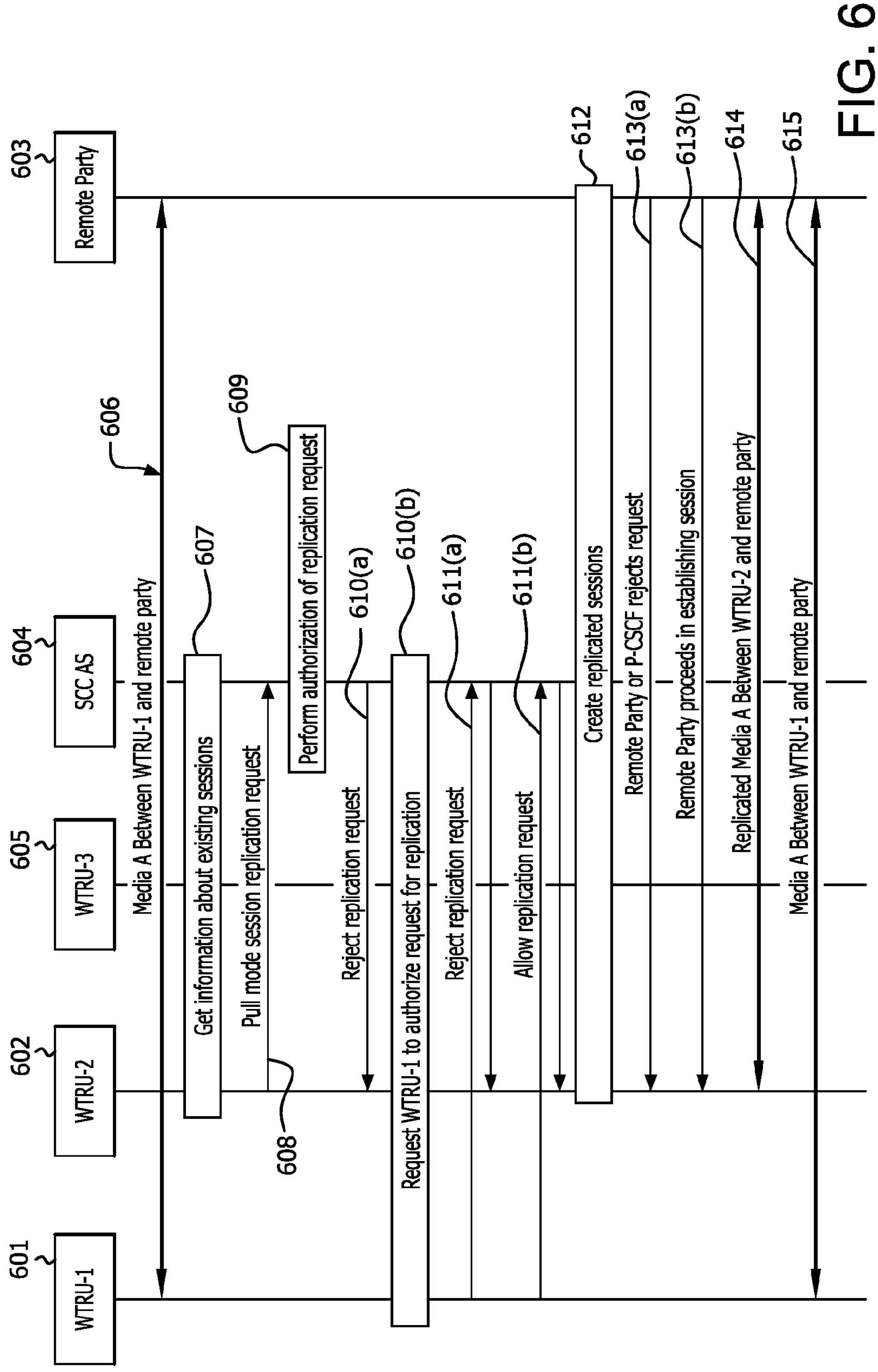
FIG. 6 shows a first example of authorizing replication requests.

FIG. 6 shows a signaling diagram for a first example of authorizing replication requests. A media flow, Media-A, may be established between WTRU-1 601 and a remote party 603 (606). WTRU-2 602 may request information about existing media sessions from the SCC AS 604 (607). WTRU-2 602 may request pull mode session replication from the SCC AS 604 (608). The SCC AS 604 may then perform authorization of the replication request (609). The SCC AS may reject the replication request (610(*a*)) or request WTRU-1 601 to authorize the request for replication (610(*b*)).

WTRU-1 601 may reject the replication request (611(*a*)) or allow the replication request (611(*b*)). If the replication request is rejected, the process starts all over again; in some embodiments it may not revert back to the previous step. On a condition that the replication request is allowed, WTRU-2 602 may then create replication sessions with the remote party 603 (612). The remote party 603 or the P-CSCF (the first entity within IMS that WTRU-1 601 directly signals with) serving the remote party 603 may reject the request (613(*a*)) or the remote party 603 may proceed in establishing a session with WTRU-2 602 (613(*b*)). A replication Media-A may then occur between WTRU-2 602 and the remote party 603 (614). Media-A may be established between WTRU-1 601 and the remote party 603 (615).

Figure 7:
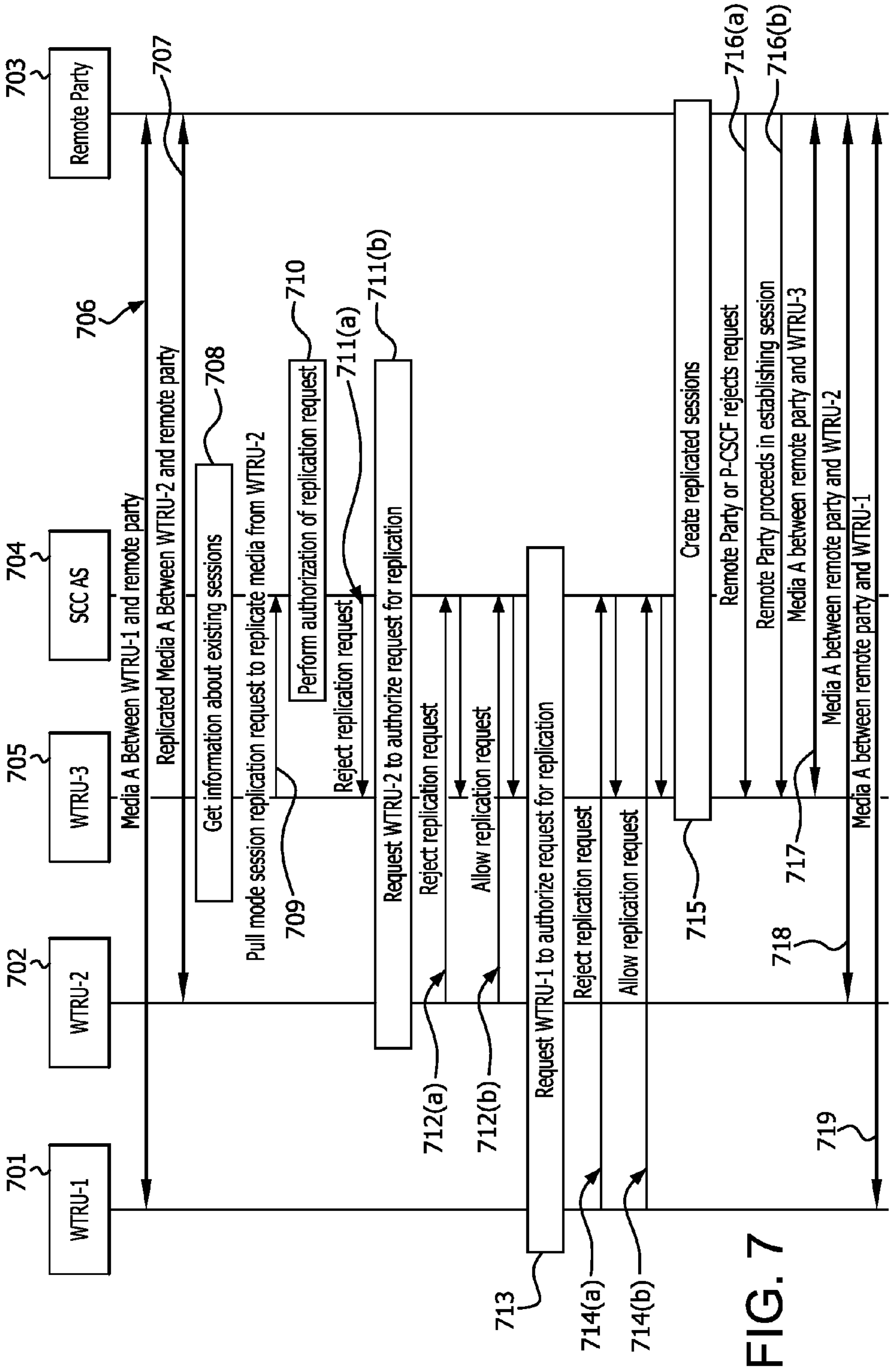
FIG. 7 shows a second example of authorizing replication requests.

FIG. 7 shows a signaling diagram for a second example of authorizing replication requests. A media flow, Media-A, may be established between WTRU-1 701 and a remote party 703 (706). Replicated Media A is established between WTRU-2 702 and the remote party 703 (707). WTRU-3 705 may request information about existing media session from the SCC AS 705 (708). WTRU-3 705 may request pull mode session replication to request replicate media from WTRU-2-702 (709). The SCC AS 704 may then perform authorization of the replication request (710). The SCC AS 704 may reject the replication request (711(*a*)) or request WTRU-2 702 to authorize the request for replication (711(*b*)).

WTRU-2 702 may reject the replication request (712(*a*)) or allow the replication request (712(*b*)). If the replication request is rejected, the process starts all over again; in some embodiments it may not revert back to the previous step. On a condition that the replication request is allowed, the SCC AS 704 may request WTRU-1 701 to authorize the request for replication since the original session was on WTRU-1 701 (713). WTRU-1 701 may reject the replication request (714(*a*)) or allow the replication request (714(*b*)). On a condition that the replication request is allowed, WTRU-3 705 may create replicated sessions with the remote party 703 (715). The remote party 703 or the P-CSCF serving the remote party 703 may reject the request (716(*a*)) or the remote party 703 may proceed in establishing a session with WTRU-3 705 (716(*b*)). Media-A may be established between WTRU-3 705 and remote party 703 (717), between WTRU-2 703 and remote party 703 (718), and between remote party 703 and WTRU-1 701 (719).

After replication, the session between WTRU-2 and the remote party may be identical, but independent of the session between WTRU-1 and the remote party. Thus, there is a possibility that WTRU-2 may perform IUT, of the entire session or media components, to transfer the session to a different WTRU.

WTRU-1 or the remote party may not want such a transfer to occur, due to the nature of the session or not knowing to which WTRU the session is being transferred. Therefore, the SCCAS may police the transfer to prevent IUT to unfriendly devices or users. WTRU-1 and the remote party may also be given the opportunity to reject such an IUT attempt. Thus if WTRU-2 sent a request for inter-WTRU transfer of the session or some or all media to WTRU-3, WTRU-1 may be made aware of this attempt. WTRU-1 may have a profile stored at the SCC AS that allows such authorization to be performed on its behalf. When a remote party gets a session update as a result of IUT, the remote party may reject such modification to the session or accept it.

Figure 8:
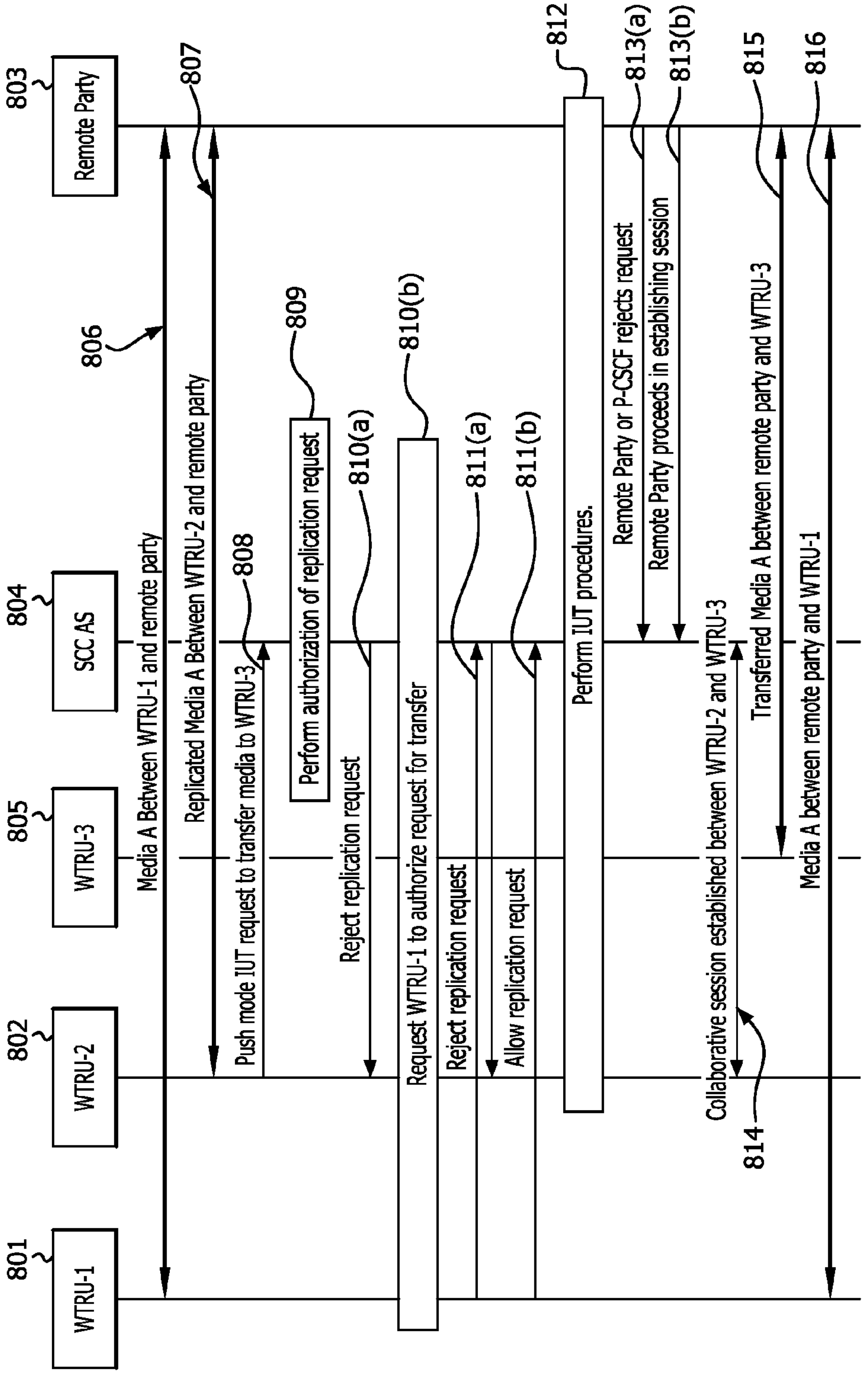
FIG. 8 shows an example of authorization of IUT after replication.

FIG. 8 shows a signaling diagram of an example authorization of IUT after replication. A media flow, Media-A, may be established between WTRU-1 801 and a remote party 803 (806). Replicated Media A is established between WTRU-2 802 and the remote party 803 (807). WTRU-2 802 may transmit a push mode IUT request to transfer media, Media-A, to WTRU-3 805 to the SCC AS 804 (808). SCC AS 804 may perform authorization of the replication request (809). SCC AS 804 may reject the replication request (810(*a*)) or request WTRU-1 801 to authorize the request for replication (810(*b*)).

WTRU-1 801 may reject the replication request (811(*a*)) or allow the replication request (811(*b*)). If the replication request is rejected, the process starts all over again; it does not revert back to the previous step. On a condition that the replication request is allowed, WTRU-2-802 may perform IUT procedures (812). The remote party 803 or P-CSCF serving the remote party 803 may reject the request (813(*a*)) or the remote party 803 may proceed in establishing a session with the SCC AS 804 (813(*b*)). A collaborative session may be established between WTRU-2 802 and WTRU-3 805 (814). Media-A may then be transferred between remote party 803 and WTUR-3 805 (815). Media-A may be established between WTRU-1 801 and remote party 803 (816).

Figure 9:
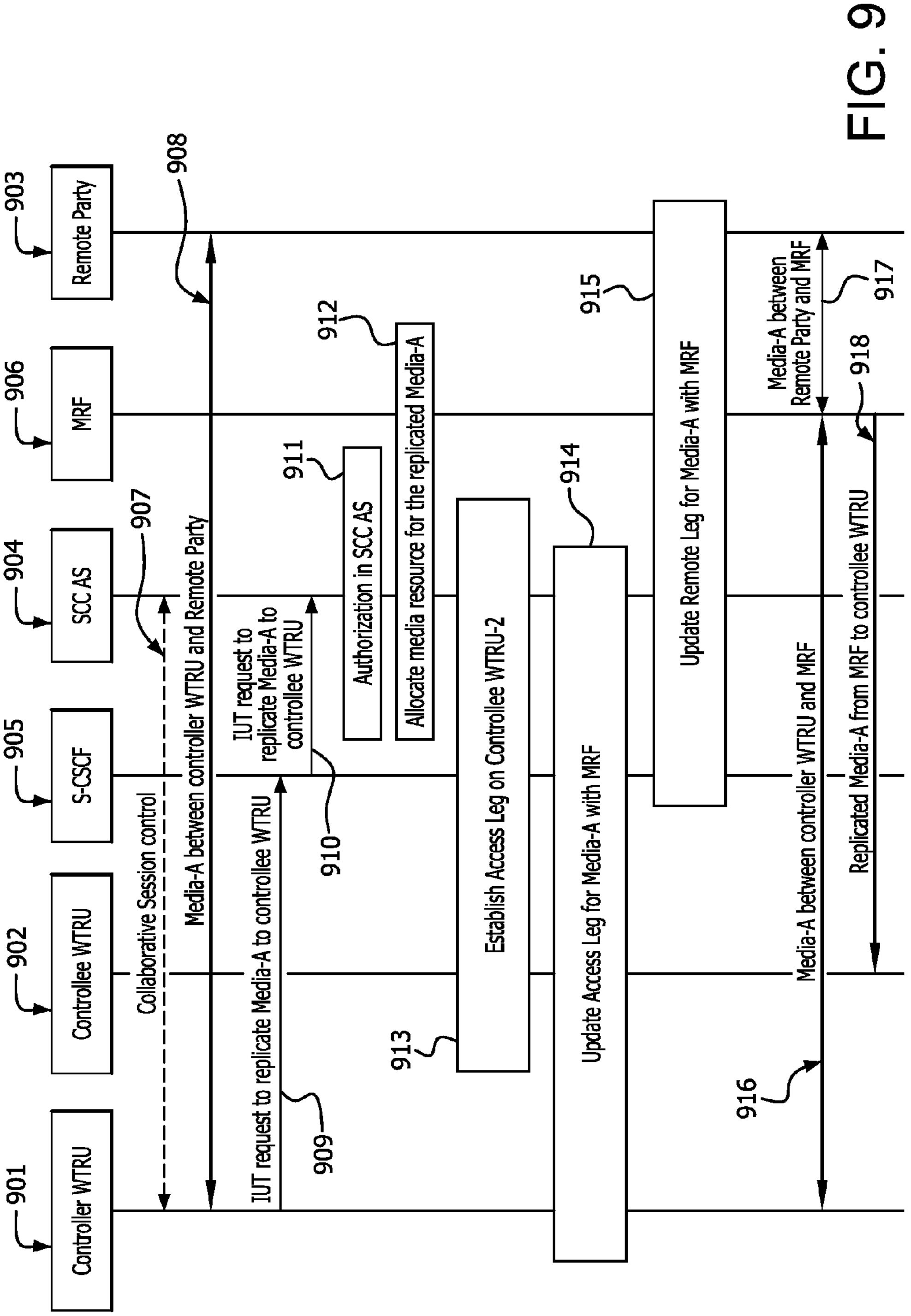
FIG. 9 shows an example of authorization of replication by a network using push mode.

FIG. 9 shows a signaling diagram of an example of authorization of replication by a network using push mode. A collaborative session control may be established between controller WTRU 901 and the SCC AS 905 (907). A media session, Media-A, may be established between controller WTRU 901 and remote party 903 (908). Controller WTRU 901 may transmit an IUT request to replicate Media-A to controlee WTRU 902 to S-CSCF 905 (909). The S-CSCF 905 may forward the IUT request to replicate Media-A to controlee WTRU 902 to SCC AS 904 (910). The SCC AS 904 may authorize whether controller WTRU 901 may request replication (911) based on operator policy and subscription restrictions. The SCC AS 904 may allocate media resource for the replicated Media-A (912).

Controlee WTRU 902 may accept or reject the request for replication. Controlee WTRU 902 may reject the request for replication because it is too busy to take on further sessions or lacks necessary the capabilities. On a condition that the request is accepted, SCC AS 904 may transmit a request to establish an access leg at controlee WTRU 902 for Media-A (913). SCC AS 904 may then update the access leg on controller WTRU 901 for the replicated media flow, Media-A, with MRF 906 (914). SCC AS 904 may then update the remote leg to communicate Media-A with MRF 906 (915). Remote party 903 may not want to replicate a media session due to the sensitive nature of the session or not knowing the user of controlee WTRU 902. Media may the be established between controller WTRU 901 and MRF 906 (916), between controlee WTRU 902 and MRF 906 (918), and between remote party 903 and MRF 906 (917).

Once the media has been replicated, the operator policy and or subscription restrictions may place limits on how many replications of the same media can occur and to which WTRU it may be transferred, if at all. The original session participants, controller WTRU 901 and remote party 903 may be notified of any further actions that are performed on the replicated media sessions.

Figure 10:
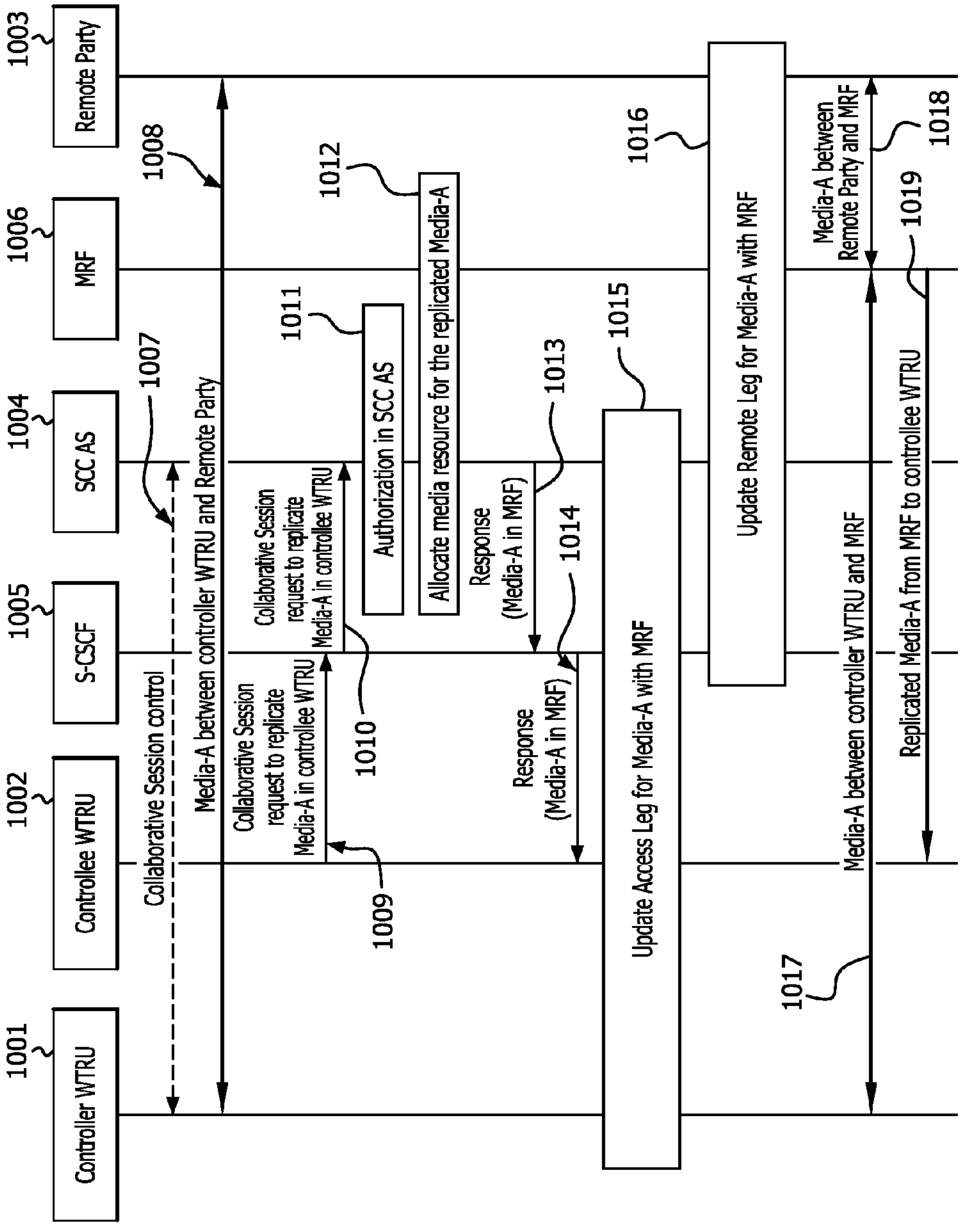
FIG. 10 shows an example of authorization of replication by a network using pull mode.

FIG. 10 shows a signaling diagram of an example of authorization of replication by a network using pull mode. A collaborative session control may be established between controller WTRU 901 and the SCC AS 1005 (1007). A media session, Media-A, may be established between controller WTRU 1001 and remote party 1003 (1008). A collaborative session request to replicate Media-A in controlee WTRU 1002 may be transmitted to S-CSCF 1005 (1009). The S-CSCF 1005 may forward the IUT request to replicate Media-A to controlee WTRU 1002 to the SCC AS 1004 (1010). The SCC AS 1004 may authorize whether controller WTRU 1001 may request replication (1011) based on operator policy and subscription restrictions. The SCC AS 1004 may then allocate media resource for the replicated Media-A (1012). The SCC AS 1004 may then transmit a response regarding Media-A in MRF 1006 to S-CSCF 1005 (1013). The S-CSCF 1006 may then forward the response regarding Media-A in MRF 1006 to controlee WTRU 1002 (1014).

Controller WTRU 1001 may accept or reject the request for replication. Controller WTRU 1001 may reject the request for replication because it does not know the user of controlee WTRU 1002 or it may not want to share sensitive information. On a condition that the request is accepted, SCC AS 1004 may update the access leg on controller WTRU 1001 for the replicated media flow, Media-A, with MRF 1006 (1015). SCC AS 1004 may then update the remote leg to communicate Media-A with MRF 1006 (1016). Remote party 1003 may not want to replicate a media session due to the sensitive nature of the session or not knowing the user of controlee WTRU 1002. Media may then be established between controller WTRU 1001 and MRF 1006 (1017), between controlee WTRU 1002 and MRF 1006 (1019), and between remote party 1003 and MRF 1006 (1018).

Once the media has been replicated the operator policy and or subscription restrictions may place limits on how many replications of the same media can occur and to which WTRU it may be transferred, if at all. The original session participants, controller WTRU 1001 and remote party 1003 may be notified of any further actions that are performed on the replicated media sessions.

When the SCC AS receives a request for IUT from a WTRU, the Session Initiated Protocol (SIP) message may be different to identify a replication of media or session versus a transfer of media or session. With transfer, media can originate from either the controller WTRU, the remote party, or both. After the transfer, the media originates from either controlee WTRU, remote party, or both. Whereas for replication, the media may originate from the remote party, unless for replication by the network the MRF replicates media flows from the controller WTRU to the controlee WTRU.

An explicit way to differentiate between transfer and replication may include a specific header field to indicate which session is to be replicated. Thus, a header such as "Replicate header field" may be standardized to include the dialog-identification (ID) of the session to be duplicated.

In session description protocol (SDP) a media level i-line may be used to indicate that the media is to be replicated. The "i=" field is intended to provide a free-form human-readable description of the session or the purpose of the media stream. It may not be suitable for parsing automata. In one embodiment, "i=replicate" for example, may be standardized. The value "i=transfer", may be used to explicitly indicate transfer of a media component. Alternatively, a new "a" attribute may be defined to indicate either "transfer" or "replicate" per media component. For example, a new "a" attribute may be "a=replicate". The attribute may be included at a media level, to identify a particular media component to be replicated, or at a session level, to indicate that the entire session, including all media components is to be replicated.

Further, replication may be indicated through including an eXtensible Markup Language (XML) body in the request for replication. This request may include information that a certain media component or the entire session is to be replicated. The XML body may include information in addition to which media components are to be replicated. For example, information that may also be included in the XML body may be the identity of the requestor of the replication, whether replication is desired to be performed by the network, or by the remote party, if specific media flows are to be replicated or if the entire session is to be replicated, where the media and/or session is to be replicated and the originator of the media and/or session may be included. The session ID of the session or the media flows in the session to be replicated may also be included in the XML body.

Figure 11:
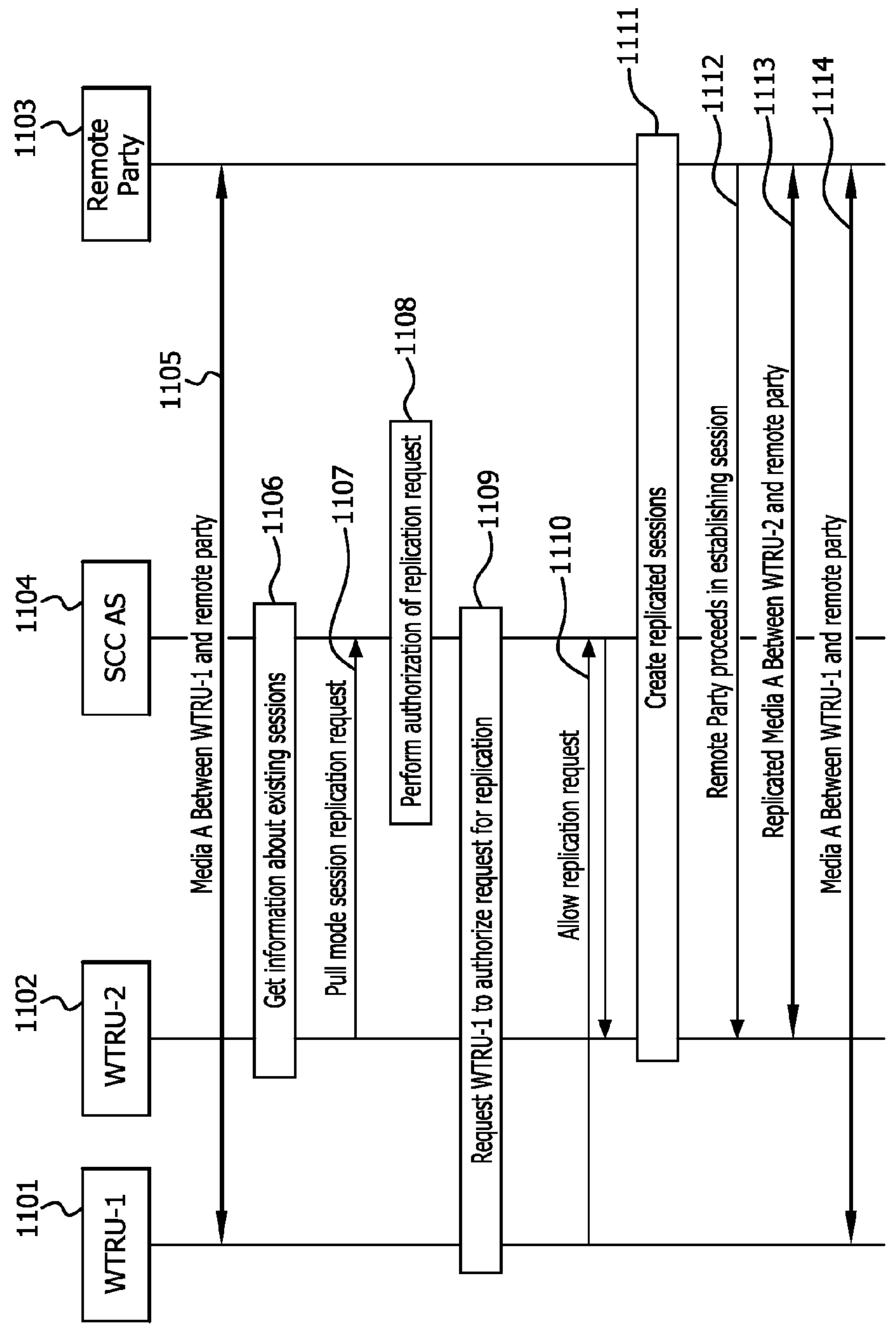
FIG. 11 shows an example of using a replication indicator.

FIG. 11 shows a signaling diagram for using a replication indicator. A media flow, Media-A, may be established between WTRU-1 1101 and a remote party 1103 (1105). WTRU-2 1102 may request information about existing sessions (1106). WTRU-2 1102 may transmit a pull mode session replication request to SCC AS 1104 (1107). For example, the request may be an invite which may include any one of the following: replicate header field with dialog-ID of an existing session between WTRU-1 1101 and remote party 1103, media level "i=" field or "a=" field with replicate value, or XML body indicating which media components or entire session to be replicated. One of these indicators, or a combination of both, may be included in the SIP request for replication.

SCC AS 1104 may perform authorization of the replication request (1108). SCC AS 1104 may transmit a request for authorization of the request for replication to WTRU-1 1101 (1109). For example the request may be an UPDATE request. WTRU-1 may allow the replication request (1110). SCC AS 1104 may create a replicated session (1111). The replication indicator, as included in the replication request, may also be included in the SIP messages (1110 and 1111). Remote party 1103 may proceed in established a session (1112). Replicated Media-A may be established between WTRU-2 1102 and remote party 1103 (1113). Media-A may be established between WTRU-1 1101 and remote party 1103 (1114).

Figure 12:
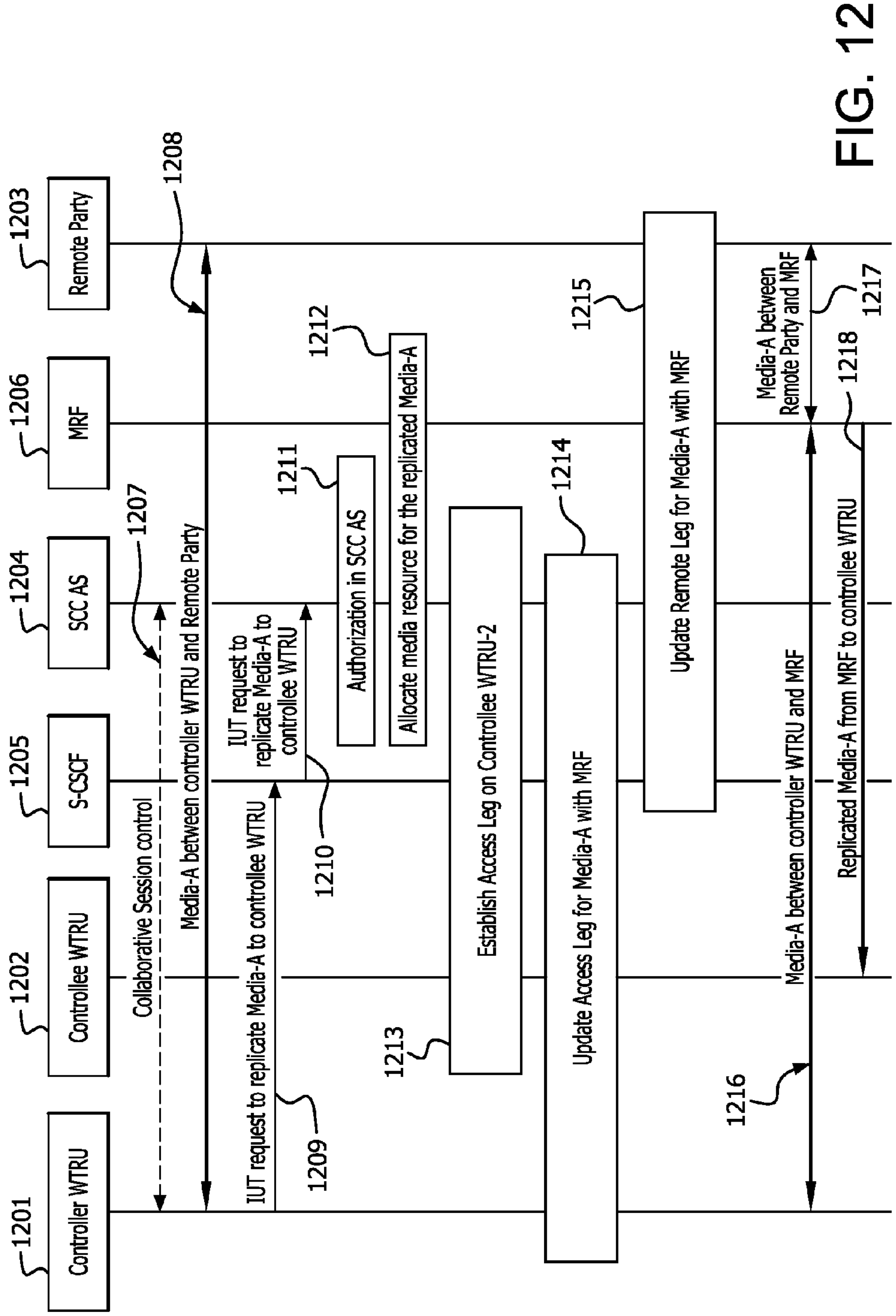
FIG. 12 shows an example of using a replication indicator and replication by the network using push mode.

FIG. 12 shows a signaling diagram for using a replication indicator and replication by the network using push mode. A collaborative session control may be established between controller WTRU 1201 and SCC AS 1204 (1207). A media flow, Media-A, may be established between controller WTRU 1201 and remote party 1203 (1208). Controller WTRU 1201 may transmit an IUT request to replicate Media-A to controlee WTRU 1202 to S-CSCF 1205 (1209).

The replication request is likely to be a REFER request. In a Refer-To header, the Replicate header field may be included, containing the dialog-ID of the session to be replicated. If specific media components are to be replicated, they may be indicated in an identical manner as in a normal IUT transfer request. Otherwise, any one of the following indicators for replication may be used: "i=" field or "a=" field appended to each media description included in the Refer-To header field or XML body indicating which session (dialog-ID) or which media components are to be replicated.

S-CSCF 1205 may forward the IUT request to replicate Media-A to controller WTRU 1202 to SCC AS 1204 (1210). SCC AS 1204 may perform authorization of the replication request (1211). SCC AS 1204 may then allocate media resource for replicated Media-A (1212). SCC AS 1204 may then transmit a request to establish an access leg on controlee WTRU 1202 for Media-A (1213). SCC AS 1204 may then update the access leg on controller WTRU 1201 for the replicated media flow, Media-A with MRF 1206 (1214). SCC AS 1204 may then update the remote leg to communicate Media-A with MRF 1206 (1215).

The replication indication may also be included in the request to establish an access leg, the update of the access leg, and the update of the remote leg. If the Replicate header field is used, then in re-INVITE or UPDATE messages, the header appears as a normal header field and includes a dialog-ID of the session to be replicated. The SDP indicators may be included in the offer and/or answer. The XML body may be a normal SIP message body. Media may then be established between controller WTRU 1201 and MRF 1206 (1216), between controlee WTRU 1202 and MRF 1206 (1218), and between remote party 1203 and MRF 1206 (1217).

Figure 13:
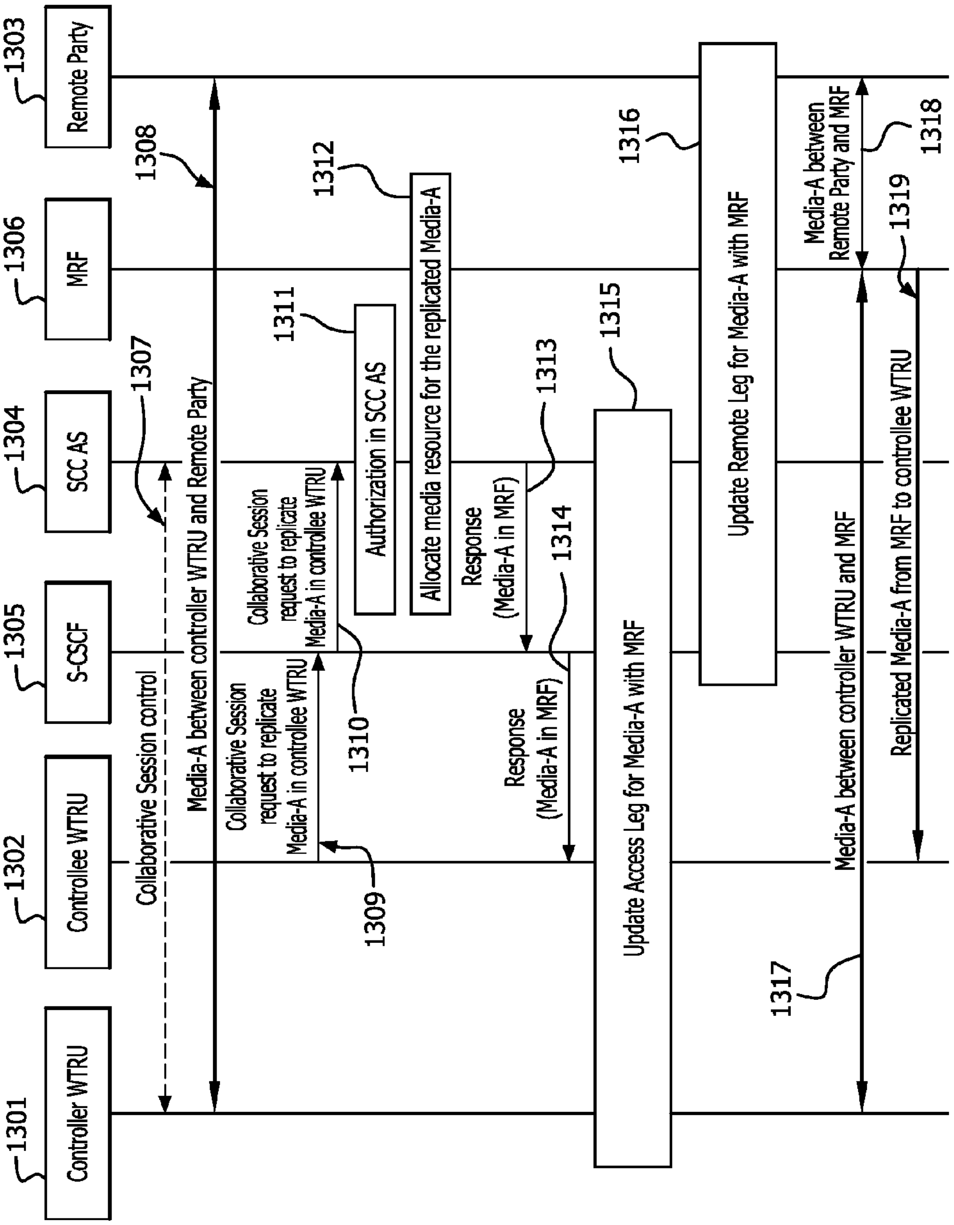
FIG. 13 shows an example of using a replication indicator and replication by the network using pull mode.

FIG. 13 shows a signaling diagram for using a replication indicator and replication by the network using pull mode. A collaborative session control may be established between controller WTRU 1301 and SCC AS 1304 (1307). A media flow, Media-A, may be established between controller WTRU 1301 and remote party 1303 (1308). Controlee WTRU 1302 may transmit a collaborative session request to replicate Media-A in controlee WTRU 1302 to S-CSCF 1305 (1309).

The replication request is likely to be an INVITE request. The Replicate header field may be included, containing the dialog-ID of the session to be replicated. If specific media components are to be replicated, then they may be included in the offer. Otherwise, any one of the following indicators for replication may be used: "i=" field or "a=" field appended to each media description included in the SDP or XML body indicating which session (dialog-ID) or which media component are to be replicated.

S-CSCF 1305 may forward the collaborative session request to replicate Media-Ain controlee WTRU 1302 to SCC AS 1304 (1310). SCC AS 1304 may perform authorization of the replication request (1311). SCC AS 1304 may then allocate media resource for the replicated Media-A (1312). SCC AS 1304 may transmit a response regarding Media-A in MRF 1306 to S-CSCF 1305 (1313). S-CSCF 1305 may forward the response regarding Media-A in MRF 1306 to controlee WTRU 1302 (1314). SCC AS 1304 may update the access leg on controller WTRU 1301 for the replicated media flow, Media-A, with MRF 1006 (1315). SCC AS 1304 may then update the remote leg to communicate Media-A with MRF 1306 (1316). Media may then be established between controller WTRU 1301 and MRF 1306 (1317), between controlee WTRU 1302 and MRF 1306 (1319), and between remote party 1303 and MRF 1306 (1318).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:

a Service Centralized and Continuity Application Server (SCC AS) establishing a collaborative session control with a first wireless transmit/receive unit (WTRU), wherein the first WTRU is associated with a first subscription, wherein the first WTRU is receiving a media flow from a remote party;

the SCC AS receiving, from the first WTRU, a collaborative session request to replicate the media flow to a second WTRU;

the SCC AS authorizing the received collaborative session request;

the SCC AS allocating a media resource at a media resource function (MRF) for the media flow;

the SCC AS establishing a second-WTRU access leg for the second WTRU to receive the requested replicated media flow from the MRF;

the SCC AS updating a first-WTRU access leg for the first WTRU to then receive the media flow from the MRF; and the SCC AS updating a remote leg to communicate the replicated media flow to the MRF, wherein, unless the remote party rejects the replication of the media flow, the media flow then flows from the remote party to the MRF, from the MRF to the first WTRU, and from the MRF to the second WTRU.

2. The method of claim 1, wherein the second WTRU is also associated with the first subscription.

3. The method of claim 1, wherein the second WTRU is not associated with the first subscription.

4. The method of claim 3, further comprising carrying out further authorization procedures at the SCC AS.

5. The method of claim 3, wherein the second WTRU is associated with a second subscription, the method further comprising carrying out further authorization procedures at the second WTRU.

6. The method of claim 1, wherein the SCC AS receives the collaborative session request from the first WTRU via a Serving-Call State Control Function (S-CSCF).

7. The method of claim 1, wherein establishing the second-WTRU access leg comprises the SCC AS transmitting a request to establish the second-WTRU access leg.

8. The method of claim 1, wherein authorizing the received collaborative session request comprises checking that the first subscription allows the requested replication of the media flow to the second WTRU.

9. The method of claim 1, wherein the SCC AS updates the remote leg to communicate the replicated media flow to the MRF unless a Proxy-Call State Control Function rejects the session replication based on decisions made by a policy and charging control function.

10. The method of claim 1, wherein the first WTRU is a controller WTRU with respect to the media flow, and wherein the second WTRU is a controllee WTRU with respect to the media flow.

11. A Service Centralized and Continuity Application Server (SCC AS) comprising:

a processor; and data storage containing instructions executable by the processor for causing the SCC AS to carry out a set of functions, the set of functions comprising:

establishing a collaborative session control with a first wireless transmit/receive unit (WTRU), wherein the first WTRU is associated with a first subscription, wherein the first WTRU is receiving a media flow from a remote party;

receiving, from the first WTRU, a collaborative session request to replicate the media flow to the second WTRU;

authorizing the received collaborative session request;

allocating a media resource at a media resource function (MRF) for the media flow;

establishing a second-WTRU access leg for a second WTRU to receive the requested replicated media flow from the MRF;

updating a first-WTRU access leg for the first WTRU to then receive the media flow from the MRF; and updating a remote leg to communicate the replicated media flow to the MRF, wherein, unless the remote party rejects the replication of the media flow, the media flow then flows from the remote party to the MRF, from the MRF to the first WTRU, and from the MRF to the second WTRU.

12. The SCC AS of claim 11, wherein the second WTRU is also associated with the first subscription.

13. The SCC AS of claim 11, wherein the second WTRU is not associated with the first subscription.

14. The SCC AS of claim 13, the set of instructions further comprising carrying out further authorization procedures at the SCC AS.

15. The SCC AS of claim 13, wherein the second WTRU is associated with a second subscription, the set of instructions further comprising carrying out further authorization procedures at the second WTRU.

16. The SCC AS of claim 11, wherein the SCC AS receives the collaborative session request from the first WTRU via a Serving-Call State Control Function (S-CSCF).

17. The SCC AS of claim 11, wherein establishing the second-WTRU access leg comprises the SCC AS transmitting a request to establish the second-WTRU access leg.

18. The SCC AS of claim 11, wherein authorizing the received collaborative session request comprises checking that the first subscription allows the requested replication of the media flow to the second WTRU.

19. The SCC AS of claim 11, wherein the SCC AS updates the remote leg to communicate the replicated media flow to the MRF unless a Proxy-Call State Control Function rejects the session replication based on decisions made by a policy and charging control function.

20. The SCC AS of claim 11, wherein the first WTRU is a controller WTRU with respect to the media flow, and wherein the second WTRU is a controllee WTRU with respect to the media flow.

* * * * *